United States Patent Office 3,424,499
Patented Jan. 28, 1969

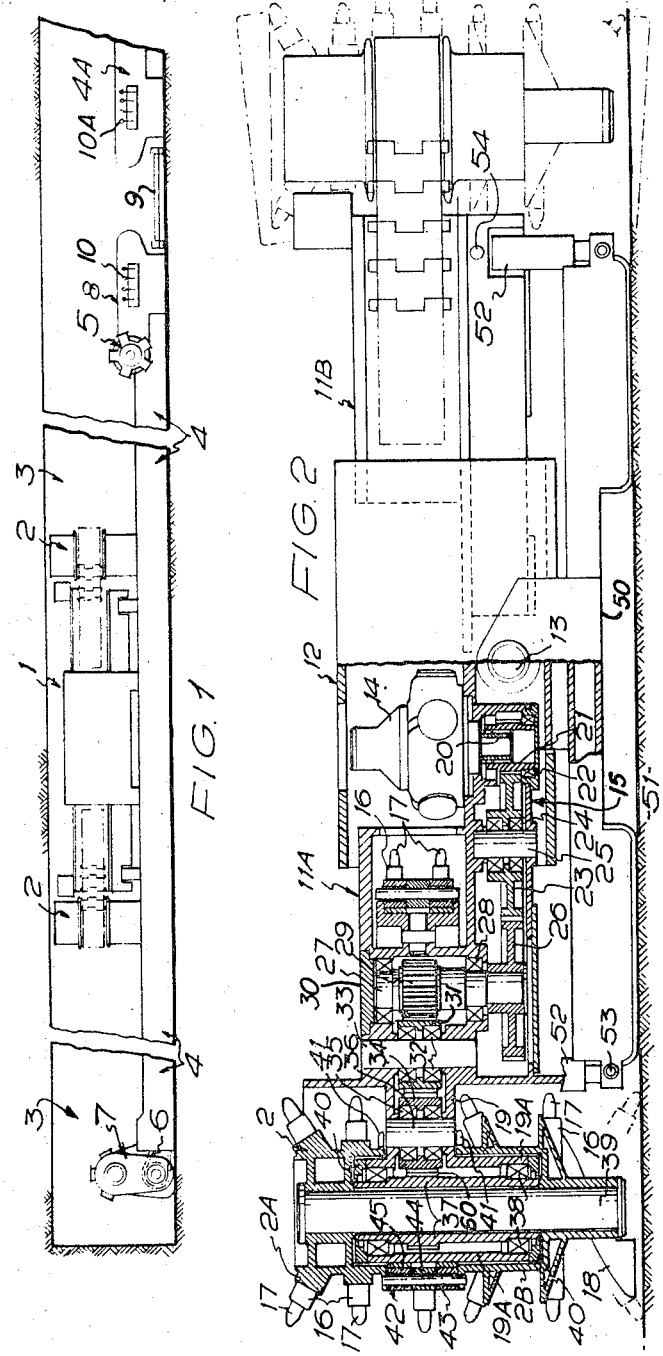

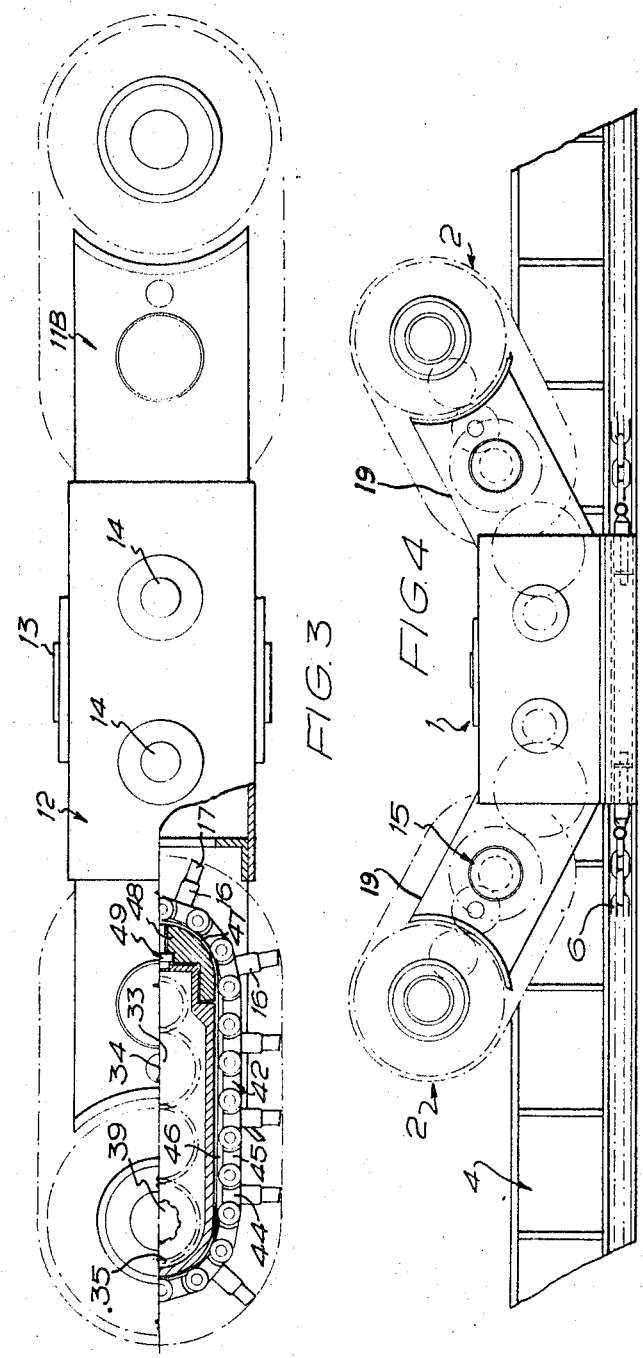

3,424,499
LONGWALL MINING MACHINE HAVING TWO
VERTICAL AXIS CUTTING DRUMS
Frederick Webster, Sheffield, England, assignor to
Webster Machine Development Limited
Filed Nov. 14, 1966, Ser. No. 594,037
Claims priority, application Great Britain, May 13, 1966,
21,316/66
U.S. Cl. 299—51                              6 Claims
Int. Cl. E21c 27/22, 25/08

ABSTRACT OF THE DISCLOSURE

A cutting machine of the type intended to be guided by and movable in both directions of an armoured face conveyor, and provided with two vertical axis cutting drums, the drums being directly driven by a train of gears within the machine frame. The overall lengthwise dimension of each drum exceeds that of the frame of the machine by which the drums are supported and from which they are driven so that the machine effects cutting of the coal by whichever is the leading drum in the particular direction of movement.

---

This invention relates to coal-cutting and other machines adapted to effect continuous attack on the mineral to be removed by a rotatable cutting drum with peripheral picks, the drum serving to remove the mineral over an area represented by the overall length and diameter of the drum, at a rate determined by the rate of advance of the machine.

A known type of coal-cutting machine has at each end a cutting drum rotatable about a vertical axis, so that the machine can be used to remove coal in each passage in opposite directions along the face of a working, the leading drum in the particular direction of movement removing coal from the whole thickness of the seam then in advance of the machine, to a height (from floor to roof) determined by the overall length of the drum. In contrast to machines having one or more cutting drums projecting transversely from the frame of the machine and rotatable about a horizontal axis, with the drive taken from inside the frame to the drum through the end of the drum next to the frame, it is impossible to drive in this manner a drum having its two ends terminating at the roof and floor levels of the section being cut. Such a vertical-axis drum, therefore, was designed for rotation by means of an endless chain running around a sprocket disposed between, and co-axially with two drum sections carrying picks, the chain itself also carrying picks to effect cutting over the intermediate portion of the total length of the drum occupied by the width of the chain, which, of course, cannot be attacked by the picks on the drum sections. The chain, in such a design, has the double duty of driving the drum and of cutting its own way into the coal. In practice, this seriously limits the amount of power capable of being transmitted to the drum, irrespective of the fact that the chain has to perform its double duty in a location where it is buried in the loose mineral that is being removed.

It is, therefore, an object of the invention to provide a cutting drum, consisting of drum sections and a cutting chain intermediate the sections with a direct drive to the sections, thus avoiding the limitation as to power-transmission occasioned by the use of a chain to drive the sections.

According to the present invention, a cutting drum has been designed for use in the continuous removal of coal and other minerals and consisting of two co-axial drum sections carrying picks and an endless chain, also carrying picks, disposed intermediately of the drum sections. The cutting drum comprises a housing, a shaft journalled in the housing, the drum sections being secured to the ends of the shaft, a hollow arm lying between the drum sections and carrying the housing, a frame carrying the arm, a train of gears within the frame, the arm, and the housing, to effect the driving of the shaft, the last of which gears is secured to the shaft and is in mesh with a gear within the arm, sprockets on the ends of the drum sections next to the arm, the endless chain being in mesh with the sprockets, a semi-circular outer surface of the housing forming with the sides of the arm an internal guide for the chain, driven by the sprockets, a semi-circular guide surface being provided within the frame to complete the internal guide, the frame being apertured for the passage of the chain to and from the guide surface within the frame.

The train of gears enables the drum to be driven directly from a source of power within or connected to the frame, so that the full power available can be used to rotate the drum, with some of the power so transmitted being imparted by the drum sections to the chain, the duty on the picks of which is confined to cutting a passage for the length of the drum assembly between the drum sections occupied by the width of the chain. The effect is therefore that of an integral drum, because the picks on the chain occupy the location to which the picks on the sections cannot extend (because they must keep clear of the supporting arm for the drum housing), but the power applied to the picks on the chain is derived from the drum sections themselves. It is therefore possible for heavy-duty picks identical to those of the drum sections to be used on the chain, with successive picks on each differently orientated so that the whole length of coal or the like being cut is attacked at some part of the rotation of the drum sections and of the chain with the drum sections. Since the power transmitted to the chain is but a small fraction of what has to be transmitted when the chain is used, as in known machines, to drive the drum, the working of the chain in loose coal is of very little consequence, as compared with such other case.

The cutting drum may be mounted with its shaft vertical with respect to the frame, as in the known type of coal-cutting machine previously mentioned; but the direction of the shaft axis is immaterial, for instance it could be horizontal for the use of the cutting drum in the formation of a trench in hard ground, the frame being carried by a tractor that both effects the progression of the drum along the trench and provides the driving power for the gears from the frame to the shaft that carries the drum sections and for the cutting chain driven by the sprockets on the drum sections.

Wear-resisting plates for the chain can be fitted round the guide surfaces. To enable the chain to be tensioned, the semi-circular guide surface within the frame can be adjustably mounted, e.g., with respect to the housing for the innermost of the train of gears in mesh with each other and the gear on the drum shaft. This innermost gear can be provided on a shaft that is connected by a further train of gears to the source of power within the frame, e.g., a rotary hydraulic motor with its axis parallel to that of the drum shaft. In the case of a coal-cutting machine with a drum at each end, the motor may drive one individual drum, another motor being provided for the other drum, or the motor may drive selectively either of the drums at the two ends of the machine.

In a coal-cutting machine in which the drum axis (or axes) is vertical, the lower section of the drum may terminate in a helical vane, with peripheral pick-boxes, the vane assisting in throwing the falling coal laterally outwards, to an armoured face conveyor on which the machine (primarily supported from the floor just cut by one of its drums) is guided along the working. The machine may have adjustable height supports, e.g., hydraulic rams disposed in pairs at the front and rear of the frame, to enable the machine to be vertically "steered," so that minor undulations of the seam can be followed.

The invention will now be further described, by way of example, with reference to the application of the machine to coal-cutting, and in the accompanying drawings:

FIGURE 1 is a diagrammatic general arrangement of the apparatus in working position;

FIGURE 2 is a half-sectional side elevation of the machine;

FIGURE 3 is a plan partly in section of FIGURE 2, and

FIGURE 4 is a diagrammatic plan view, to a smaller scale of an alternative arrangement.

In FIGURE 1, the machine is indicated as 1, having cutting drums 2 to work a longwall face 3 and being guided by face conveyor 4 with a drive motor 5 and hauled along by haulage chains 6 and hydraulic motor 7. The conveyor 4 has a raised discharge end 8 to discharge material onto transverse conveyor 9, the various devices being controlled by a bank of control valves 10. For clarity, all roof supports have been omitted from this figure.

In FIGURES 2 and 3 it can be seen that the machine is constructed in two parts, consisting of supporting and driving frames 11A, 11B for each cutting drum and a guided support being indicated generally as 12. The frames 11A, 11B are pivotally connected to one another on a central transverse pin 13 (FIGURE 3), each frame including a hydraulic motor 14, reduction gearing 15, and a cutting drum 2, each drum being provided with pick boxes 16 and picks 17 and a portion of coal elevating vane 18.

Each drum 2 includes upper and lower drum sections 2A, 2B between which is situated a hollow supporting arm 19 extending from each frame and supporting a generally vertical housing 19A.

Secured on splined output shaft 20 of each hydraulic motor 14 is a pinion 21 running in bearings 22 and meshing with gear-wheel 23 mounted on bearings 24 in turn mounted on stationary shaft 25. Gear-wheel 23 in turn meshes with gear-wheel 26 mounted on one end of a shaft 27, which runs in bearings 28, of a pinion 29. A screwed closure plate 30 secures this shaft and bearings 28 in position. Pinion 29 meshes with gear-wheel 31 mounted on bearings 32 in turn mounted on stationary shaft 33. Similarly gear-wheel 31 meshes with gear-wheel 34 mounted on bearings 35 in turn mounted on stationary shaft 36. Gear-wheel 34 meshes with a pinion 60 on a barrel 37 mounted in bearings 38 and surrounding and secured to a splined drum drive shaft 39. Closure plates 40 are secured between the ends of the barrel 37 and the housing.

A chain sprocket 41 is provided on both the lower portion of the periphery of drum section 2A and the upper portion of the periphery of drum section 2B. A chain 42 extending over the vertical distance occupied by the portion 19A of the arm is driven by sprockets 41 and consists of pins 43 extending beyond links 44, 45, alternate links carrying pick boxes 16 and picks 17.

The chains pass around the periphery of each drum and around the gear train 34, 31, 29 and 26, and are guided by wear plates 46 of U-shape (FIGURE 3) secured around the housing 19A. A second semi-circular wear plate 47 guides the chain 42 around shaft 27 the plate being secured to a block 48 adjustable by means of a screw and nut device 49 to enable the chain to be tensioned.

The pin 13 is secured above and by a base member 50 which rests on the floor 51 of the workings and projects under both frames of the machine as far as the cutting drums 2. A pair of hydraulic jacks 52 are pivotally secured at 53 to each end of the base member 50 and at 54 to each frame of the machine.

An alternative arrangement in FIGURE 4 shows the supporting bar 19 for each drum 2 inclined towards the face.

Thus with motor 5 driving the conveyor 4 (driven through gear box 55) the leading cutting drum 2 (which depends upon the direction of travel) powered by motor 14 through reduction gearing 15 and the machine hauled along the face 3 by actuation of motor 7, coal is thrown onto conveyor 4 which is able to operate at maximum capacity due to there being no protrusion over the conveyor by the supporting and driving frames 11A, 11B for the drums.

The face conveyor 4 discharges onto transverse conveyor 9, and if several machines are working side-by-side, conveyor 4A of the adjacent machine may also discharge onto conveyor 9. Consequently control valves 10, 10A for adjacent machines are situated in close proximity so that two machines can be controlled by one operator.

To enable minor undulations of the coal seam to be followed by the cutting drums jacks 52 are actuated, either individually or separately, so that each frame may move to the extreme positions indicated in chain-dotted line in FIGURE 3.

What I claim is:

1. A cutting drum for a coal cutting machine of the type intended to be guided by and movable in both directions lengthwise of an armoured face conveyor and provided with two vertical access cutting drums, the overall lengthwise dimension of which drums exceeds that of the frame of the machine by which the drums are supported and from which they are driven so that the machine effects cutting of the coal by whichever is the leading drum in the particular direction of movement, comprising in combination; a frame, a hollow arm on opposite ends of said frame extending in a longitudinal fore and aft direction along the length of the armoured face conveyor, a vertically disposed drum housing on the end of each said arm, a shaft journalled in each said housing, a top and bottom pick carrying drum section secured to the ends of each said shaft, a train of gears contained within each of said frame, said arm and said housing to effect the driving of each said shaft, the last of said gears being secured to said shaft and in mating engagement with a gear within each said arm, sprockets on the end of each of said top and bottom sections next to each said arm, a pick carrying endless chain in engagement with each of said sprockets next to each said arm, each said housing having a semi-circular outer surface forming with the sides of each said arm an internal guide for each said chain, semi-circular guides within said frame to complete said internal guides, said frame being apertured for the passage of each said chain to and from said guide within said frame.

2. A cutting drum for a coal-cutting machine according to claim 1, wherein resisting plates for each said chain are provided on the internal guide.

3. A cutting drum for a coal-cutting machine according to claim 2 wherein each said semi-circular guide within said frame is adjustably mounted to enable each said chain to be tensioned.

4. A cutting drum for a coal-cutting machine according to claim 3 wherein each said shaft is driven by a rotary hydraulic motor with their axis parallel to that of said shaft.

5. A cutting drum for a coal-cutting machine according to claim 4 wherein said bottom drum sections terminate in a helical vein with peripheral pick boxes.

6. A cutting drum for a coal-cutting machine according to claim 5 wherein each said drum is adjustable in height by means of hydraulic jacks disposed in pairs.

References Cited

UNITED STATES PATENTS

| | | | |
|---|---|---|---|
| 3,014,707 | 12/1961 | Davies | 299—51 X |
| 3,157,439 | 11/1964 | Lundquist | 299—73 |
| 3,190,698 | 6/1965 | Arentzen et al. | 299—74 X |
| 3,318,638 | 5/1967 | Kilbourne | 299—64 X |

ERNEST R. PURSER, *Primary Examiner.*

U.S. Cl. X.R.

299—74, 80

PO-1050
(5/69)

UNITED STATES PATENT OFFICE
CERTIFICATE OF CORRECTION

Patent No. 3,424,499          Dated January 28, 1969

Inventor(s) Frederick Webster

It is certified that error appears in the above-identified patent and that said Letters Patent are hereby corrected as shown below:

Claim 1, line 4, delete "access" and substitute "axis".

SIGNED AND
SEALED

SEP 30 1969

(SEAL)
Attest:

Edward M. Fletcher, Jr.
Attesting Officer

WILLIAM E. SCHUY
Commissioner of